(12) United States Patent
Hope et al.

(10) Patent No.: US 7,941,526 B1
(45) Date of Patent: May 10, 2011

(54) TRANSMISSION OF SYSLOG MESSAGES OVER A ONE-WAY DATA LINK

(75) Inventors: James Hope, Greenwich, CT (US); Ronald Mraz, South Salem, NY (US); Andrew Holmes, Darien, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 368 days.

(21) Appl. No.: 11/788,156

(22) Filed: Apr. 19, 2007

(51) Int. Cl.
*G06F 15/173* (2006.01)
(52) U.S. Cl. ...................................... 709/224
(58) Field of Classification Search .................... 709/224
See application file for complete search history.

(56) References Cited

U.S. PATENT DOCUMENTS

| | | | |
|---|---|---|---|
| 4,672,601 A | 6/1987 | Ablay | 370/277 |
| 5,282,200 A | 1/1994 | Dempsey et al. | 370/245 |
| 5,703,562 A | 12/1997 | Nilsen | |
| 5,769,527 A | 6/1998 | Taylor et al. | 362/85 |
| 5,983,332 A | 11/1999 | Watkins | 711/202 |
| 6,108,787 A | 8/2000 | Anderson et al. | |
| 6,262,993 B1 | 7/2001 | Kirmse | 370/463 |
| 6,269,398 B1 | 7/2001 | Leong et al. | |
| 6,415,329 B1 | 7/2002 | Gelman et al. | |
| 6,546,422 B1 | 4/2003 | Isoyama et al. | 709/225 |
| 6,665,268 B1 | 12/2003 | Sato et al. | 370/242 |
| 6,728,213 B1 | 4/2004 | Tzeng et al. | 370/235 |
| 6,731,625 B1 | 5/2004 | Eastep et al. | |
| 6,792,432 B1 | 9/2004 | Kodavaila et al. | 707/103 R |
| 6,807,166 B1 * | 10/2004 | Ohura | 370/352 |
| 6,954,790 B2 | 10/2005 | Forslow | |
| 6,988,148 B1 * | 1/2006 | Sheth | 709/245 |
| 7,007,301 B2 | 2/2006 | Crosbie et al. | |
| 7,016,085 B2 * | 3/2006 | Gonzalez et al. | 358/405 |
| 7,020,697 B1 | 3/2006 | Goodman et al. | |
| 7,095,739 B2 | 8/2006 | Mamillapalli et al. | 370/390 |
| 7,134,141 B2 | 11/2006 | Crosbie et al. | |

(Continued)

FOREIGN PATENT DOCUMENTS

WO   WO 2004/105297 A2   12/2004

OTHER PUBLICATIONS

Ian Eaton, "The Ins and Outs of System Logging Using Syslog," 2003, SANS Institute, Australia.

(Continued)

*Primary Examiner* — David Y Eng
(74) *Attorney, Agent, or Firm* — Amster, Rothstein & Ebenstein LLP

(57) ABSTRACT

A special syslog daemon on a send node, wherein the send node is connected to a receive node by a one-way data link, the special syslog daemon configured to receive a syslog message from a syslog sender, insert a portion of IP information of the syslog sender in the body of the received syslog message and route the resulting syslog message to the one-way data link so that the resulting syslog message can be sent through the one-way data link to a syslog receiver communicatively coupled to the receive node. The present invention resolves the potential conflict between syslog and one-way data transfer applications that are configured to remove IP information from data prior to its passage through a one-way data link, thereby leading to a further enhancement of network security through their combination.

10 Claims, 2 Drawing Sheets

U.S. PATENT DOCUMENTS

| | | | |
|---|---|---|---|
| 7,167,915 B2 | 1/2007 | Bendich et al. | |
| 7,246,156 B2 | 7/2007 | Ginter et al. | |
| 7,260,833 B1 | 8/2007 | Schaeffer | |
| 7,339,929 B2 | 3/2008 | Zelig et al. | 370/390 |
| 7,356,581 B2 | 4/2008 | Hashimoto | 709/224 |
| 7,370,025 B1 | 5/2008 | Pandit | 707/1 |
| 7,389,323 B2 * | 6/2008 | Tanimoto | 709/206 |
| 7,440,424 B2 * | 10/2008 | Nam et al. | 370/310 |
| 7,454,366 B2 * | 11/2008 | Kato | 705/21 |
| 7,512,116 B2 * | 3/2009 | Ohura | 370/352 |
| 7,529,943 B1 | 5/2009 | Beser | 713/181 |
| 2002/0003640 A1 | 1/2002 | Trezza | |
| 2002/0118671 A1 | 8/2002 | Staples et al. | 370/352 |
| 2002/0120578 A1 | 8/2002 | Sy | |
| 2002/0129106 A1 | 9/2002 | Gutfreund | |
| 2002/0133586 A1 | 9/2002 | Shanklin et al. | |
| 2003/0028650 A1 | 2/2003 | Chen et al. | |
| 2003/0051026 A1 | 3/2003 | Carter et al. | |
| 2003/0058810 A1 | 3/2003 | Petronic | |
| 2003/0103089 A1 | 6/2003 | Ramani et al. | |
| 2003/0119568 A1 | 6/2003 | Menard | |
| 2003/0172145 A1 | 9/2003 | Nguyen | |
| 2003/0195932 A1 | 10/2003 | Tanabe et al. | 709/205 |
| 2003/0200321 A1 | 10/2003 | Chen et al. | |
| 2004/0073658 A1 | 4/2004 | Oran et al. | |
| 2004/0103199 A1 | 5/2004 | Chao et al. | 709/228 |
| 2004/0236547 A1 | 11/2004 | Rappaport et al. | |
| 2004/0236874 A1 | 11/2004 | Largman et al. | |
| 2004/0260733 A1 | 12/2004 | Adelstein et al. | |
| 2005/0005154 A1 | 1/2005 | Danforth et al. | |
| 2005/0033990 A1 | 2/2005 | Harvey et al. | |
| 2005/0037787 A1 | 2/2005 | Bachner, III et al. | |
| 2005/0091396 A1 | 4/2005 | Nilakantan et al. | |
| 2005/0201373 A1 | 9/2005 | Shimazu et al. | 370/389 |
| 2005/0216421 A1 | 9/2005 | Barry et al. | |
| 2005/0259587 A1 | 11/2005 | Wakumoto et al. | 370/248 |
| 2006/0018466 A1 | 1/2006 | Adelstein et al. | |
| 2006/0031481 A1 | 2/2006 | Patrick et al. | |
| 2006/0059253 A1 | 3/2006 | Goodman et al. | |
| 2006/0080441 A1 | 4/2006 | Chen et al. | |
| 2006/0114566 A1 | 6/2006 | Ohmori et al. | 359/566 |
| 2006/0153092 A1 | 7/2006 | Matityahu et al. | |
| 2006/0153110 A1 | 7/2006 | Morgan et al. | 370/310 |
| 2006/0161395 A1 | 7/2006 | Beam et al. | |
| 2006/0173850 A1 | 8/2006 | Auer et al. | 707/10 |
| 2006/0190592 A1 | 8/2006 | Fujita et al. | |
| 2006/0209719 A1 | 9/2006 | Previdi et al. | |
| 2006/0288286 A1 | 12/2006 | Chandler et al. | |
| 2007/0223158 A1 | 9/2007 | Ma et al. | 361/56 |
| 2009/0024612 A1 | 1/2009 | Tang et al. | 707/5 |

OTHER PUBLICATIONS

M. Anderson, C. North, J. Griffin, R. Milner, J. Yesberg, K. Yiu, "Starlight: Interactive Link," 1996, Defence Science & Technology Organisation, Salisbury, South Australia, Australia.

"Interactive Link White Paper," Jul. 27, 2001, Tenix Defence Pty Ltd, Mawson Lakes, South Australia, Australia.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

Nilsen, Curt A., Information Security implementations for Remote Monitoring; Symposium on Int'l Safeguards, Int'l Atomic Energy Agency, Vienna, Austria, Oct. 13-17, 1997.

Nilsen, Curt A. et al., The Secure Data Mirror; INMM; Nuclear Materials Management; vol. XXXVII (No. 2), 39th Annual Mtg. Proceedings, Naples, FL, Jul. 26-30, 1998, pp. 1322-1327.

* cited by examiner

US 7,941,526 B1

TRANSMISSION OF SYSLOG MESSAGES OVER A ONE-WAY DATA LINK

FIELD OF INVENTION

The present invention relates generally to unidirectional data transfer. More particularly, the present invention relates to transmission of syslog messages over a one-way data link.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), the contents of which are hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms (or nodes) 101 and 102 (respectively, "the Send Node" and "the Receive Node") are connected to the unsecured external network 104 ("the source network") and the secure network 105 ("the destination network"), respectively. The Send Node 101 is connected to the Receive Node 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the Send Node and to an optical receiver on the Receive Node.

This configuration physically enforces one-way data transfer at both ends of the optical fiber connecting the Send Node 101 to the Receive Node 102, thereby creating a truly unidirectional one-way data link between the source network 104 and the destination network 105 shown in FIG. 1. Unlike the conventional firewalls, one-way data transfer systems based on a one-way data link are designed to transfer data or information only in one direction and it is physically impossible to transfer data or information of any kind in the reverse direction. No information or data of any kind, including handshaking protocols such as those used in data transport protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

The modern network communications involve various data types, such as files, e-mails, Web contents, real-time audio/video data streams, etc., and also various data transport protocols, such as the Transmission Control Protocol (TCP) and the User Datagram Protocol (UDP). TCP has been known for its reliability and therefore considered suitable for transporting files and e-mails. UDP, on the other hand, has typically been used for transporting time-sensitive data streams, such as real-time audio/video data streams and also for transporting syslog messages.

Syslog is a standard for sending system log messages ("syslog messages") via UDP in an IP network. Syslog messages comprise small textual messages from a syslog sender to a syslog receiver (also called syslog daemon, or syslog server), typically in cleartext, and may be configured to report activities at specific addresses in a network. A syslog receiver (syslog daemon) on the hosting platform is responsible for adding to the syslog message received from a syslog sender the IP address or hostname of the syslog sender and writing the result to a local syslog message file. The IP address or hostname of the originating syslog sender is a portion of IP information and may be found in the IP information area of the received syslog message. Syslog messages can be of particular importance in ensuring network security, as the activities of network intruders can be traced by syslog records and irregularities they generate in syslog files. Accordingly, syslog is frequently used as a tool for computer system management, network security auditing, and diagnostic functions. Syslog is supported by a wide array of platforms based on Unix-based operating systems, such as Solaris, Ultrix, AIX, HP-UX and Linux.

Because of many advantages syslog provides for network security and management, it is often desirable and necessary to implement syslog in a one-way data transfer system based on a one-way data link. Thus, it is an object of the present invention to handle transmission of syslog messages across a one-way data link.

Other objects and advantages of the present invention will become apparent from the following description.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

SUMMARY OF THE INVENTION

It has now been found that the above and related objects of the present invention are obtained in the form of several related aspects.

More particularly, the present invention relates to a special syslog daemon on a send node, wherein the send node is connected to a receive node by a one-way data link, the special syslog daemon comprising a port for receiving a syslog message from a syslog sender, and a processor for inserting a portion of IP information of the syslog sender in the body of the received syslog message and routing the resulting syslog message to the one-way data link so that the resulting syslog message can be sent through the one-way data link to a syslog receiver communicatively coupled to the receive node.

The present invention is also directed to a one-way data transfer system, comprising a send node communicatively coupled to one or more source platforms, a receive node communicatively coupled to one or more destination platforms, a one-way data link interconnecting the send node and the receive node for unidirectional transfer from the send node to the receive node, and a special syslog daemon on the send node for receiving a syslog message from a syslog sender on one of the source platforms, inserting a portion of IP information of the syslog sender in the body of the received syslog message, and routing the resulting syslog message to the one-way data link so that the resulting syslog message can be transferred to a syslog receiver on one of the destination platforms.

Furthermore, the present invention also relates to a machine readable medium having instructions stored on a send node, the instructions, when executed by the send node, causing the send node to receive a syslog message from a syslog sender, insert a portion of IP information of the syslog sender in the body of the received syslog message, and send the resulting syslog message to the receive node through a one-way data link to be transmitted to a syslog receiver, wherein the send node is connected to the receive node by the one-way data link, the syslog sender is communicatively coupled to the send node, and the syslog receiver is communicatively coupled to the receive node.

In addition, the present invention is also directed to a method of transmitting a syslog message from a syslog sender to a syslog receiver through a one-way data link, comprising the steps of receiving the syslog message from the syslog sender, inserting a portion of IP information of the syslog sender in the body of the received syslog message, and sending the resulting syslog message to the syslog receiver through the one-way data link.

DETAILED DESCRIPTION OF PREFERRED EMBODIMENTS

Figure 1:
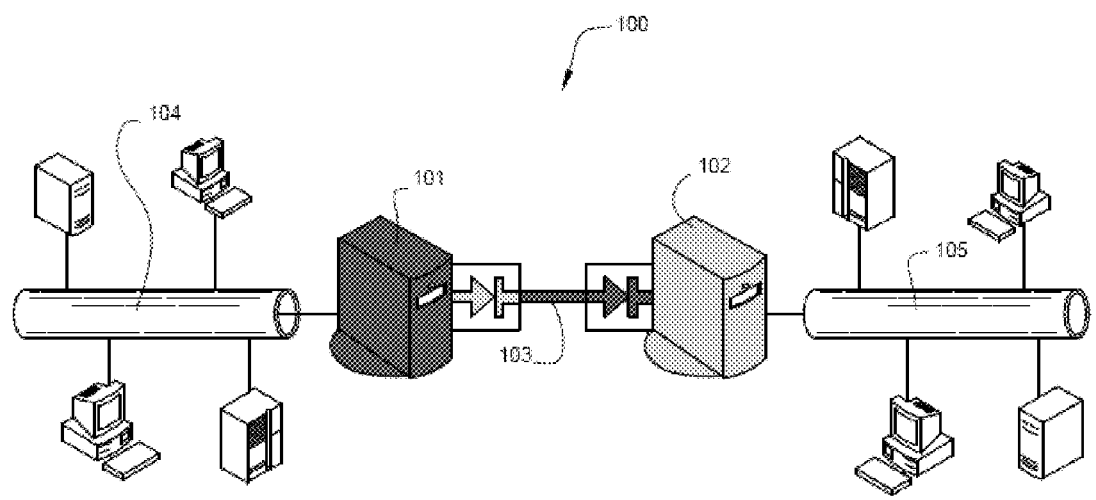
FIG. 1 schematically illustrates an example of a secure one-way data transfer system based on a one-way data link.
Figure 2:
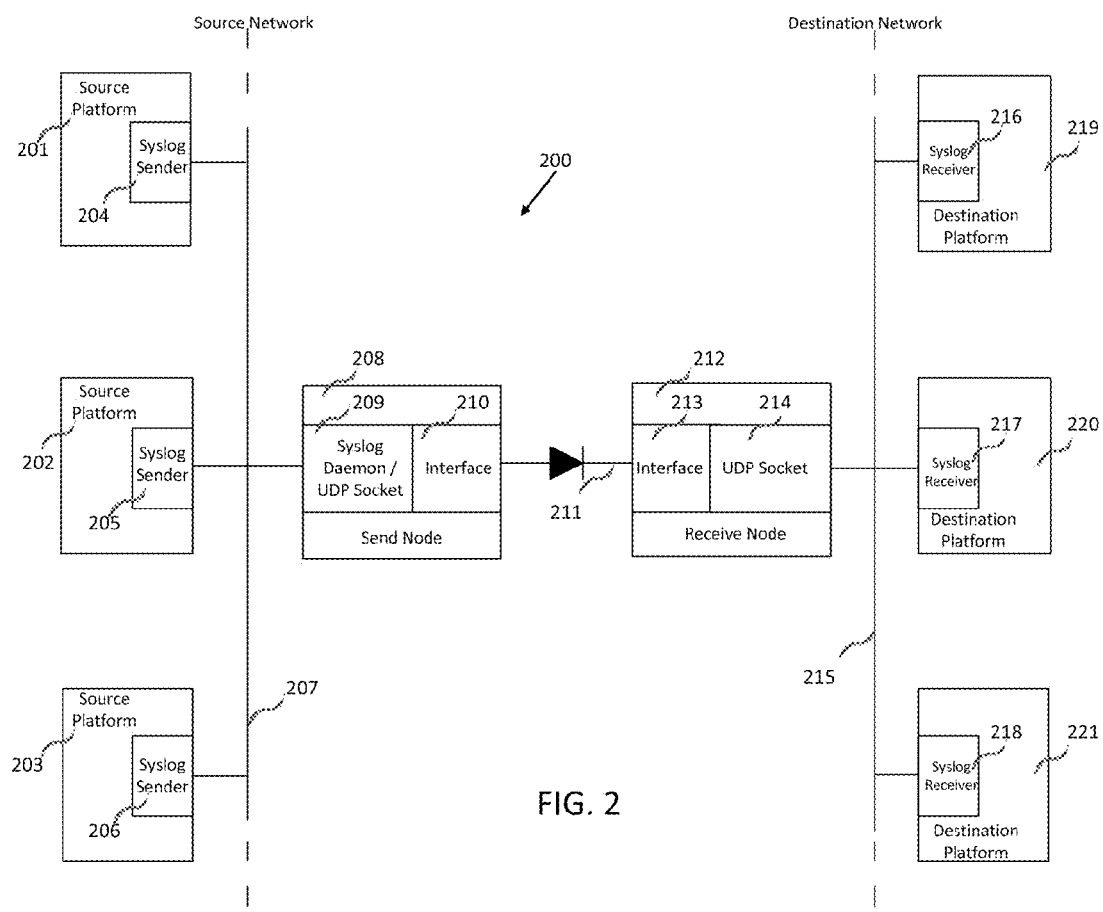
FIG. 2 is a functional block diagram that schematically illustrates one possible embodiment of the present invention for handling transmission of syslog messages through a one-way data link.

FIG. 2 is a functional block diagram that schematically illustrates one exemplary embodiment of the present invention for handling transmission of syslog messages across a one-way data link. The system 200 illustrated in FIG. 2 implements a UDP-based data transfer between a source network 207 and a destination network 215 across a single one-way link 211. One of UDP sources 204-206 in source platforms 201-203 may send a UDP datagram stream across the source network 207 to a UDP socket 209 on or coupled to a send node 208 in the system 200. The UDP datagram stream may then be transferred by the send node 208 to the one-way data link 211 via a send node interface 210 and then received by a receive node 212 through a receive node interface 213. A UDP socket or proxy application 214 on or coupled to the receive node 212 then makes a fully implemented UDP connection with one of UDP destinations 216-218 in destination platforms 219-221 through the destination network 215 and forwards the received UDP datagram stream to the intended destination.

UDP-based one-way transfer systems based on a one-way data link such as the one illustrated in FIG. 2 may be configured to prohibit passage of a raw UDP datagram including IP information or header (including IP address or hostname of the source) across the one-way data link. Instead of allowing passage of IP information, the UDP socket or proxy application 209 on the send node 208 may be configured to issue a token identifier, such as a channel number, to each datagram to be transferred across the one-way data link 211 to route it to the proper destination without revealing the IP address of its source to the destination. In this configuration, IP information may be removed from the raw UDP datagram and only the data portion (or message payload) of the UDP datagram is extracted by the send node 208 (the UDP socket 209 or some other suitable application on the send node) to be transferred across the one-way data link 211. Once the UDP datagram is received by the receive node 212, the UDP socket 214 on the receive node 212 may formulate a new datagram based on the received extracted data portion and route it to the UDP destination 216-218 based on the identifier associated with the received datagram. Accordingly, no information about the originator of the UDP datagram is passed to the receive side.

Such prohibition on transmission of a raw UDP datagram across a one-way data link may conflict with implementation of syslog message transmission in a one-way data transfer system, as the raw UDP datagram contains the necessary information (an IP address or a hostname included in IP information) for a syslog receiver to process. Since, as noted above, the purpose of syslog's diagnostic function is to track the activities occurring at a specific address in a network, syslog messages may need to indicate the necessary portion of the IP information, such as IP address or hostname, relating to the originating machines on the send side to do its proper function. The present invention resolves this potential conflict and allows a syslog receiver on the receive side of a one-way data link to properly process the syslog messages transmitted from the send side through the one-way data link, even when the UDP-based one-way data transfer system is configured to prohibit transfer of a raw UDP datagram or IP information across the one-way data link.

One exemplary embodiment of the present invention may be implemented in the UDP-based data transfer system 200 illustrated in FIG. 2 as follows. On the send side, a sender of a syslog message (syslog sender) may be any one of the UDP sources 204-206 residing in the source platforms 201-203, which are interconnected to the UDP socket or proxy application 209 on the send node 208 via the source network 207. On the receive side, the corresponding receiver of the syslog message (syslog receiver) may be any one of the UDP destinations 216-218 residing in the destination platforms 219-221, which are interconnected to the UDP socket or proxy application 214 on the receive node 212 via the destination network 215. A special syslog daemon is introduced to replace the standard syslog daemon on the send node 208 and implemented in, for example, the UDP socket 209 on the send node 208. The function of the special syslog daemon on the UDP socket is to insert or embed a desired or necessary portion of the IP information (e.g., IP address or hostname) of the syslog sender 204-206 in the body of the received syslog message (e.g., data portion) prior to passing it over to the one-way data link 211. For example, the special syslog daemon on the UDP port 209 may insert an IP address or hostname of the syslog sender 204-206, which is taken from the corresponding IP information, in the beginning of the data field of the received syslog message.

The send node 208 may be configured to further remove the IP information or header from the resulting syslog message. Despite the removal of the IP information from the message, the corresponding IP address or hostname of the syslog sender has now been embedded in the body of the syslog message. The send node 208 then transfers the resulting syslog message to the one-way data link 211 via the send node interface 210. The receive node 212 receives the syslog message from the one-way data link 211 via the receive node interface 213 and the UDP port or proxy application 214 associated with the receive node 212 then routes it to the intended syslog receiver 216-218 residing in one of the destination platforms 219-221 via the destination network 215.

When the syslog receiver 216-218 on the destination platform 219-221 finally receives the syslog message, it would only know that the syslog message came through the receive node 212 by detecting its IP information. As the IP information of the original syslog sender 204-206 on the source platform 201-203 had been removed from the syslog message prior to its passage through the one-way data link 211, the syslog receiver 216-218 on the destination platform 219-221 may not be aware of the originator of the syslog message on the send side. However, since the special syslog daemon in the UDP port 209 on the send node 208 inserted the portion of the IP information, such as IP address or hostname which identifies the original syslog sender 204-206, in the body of the syslog message before the IP information was removed from the message, a network monitoring system or administrator for the destination platforms 219-221 may be able to trace the originator of the syslog message, the syslog sender 204-206, by examining the this portion of the IP information embedded in the syslog message body.

As illustrated in the above example, the present invention allows syslog messages which are transferred across a one-way data link to include the portion of the IP information necessary to identify the syslog senders even when the IP information is removed from the syslog messages prior to crossing the one-way data link. In addition to the examples illustrated above, the present invention is applicable to other possible UDP-based one-way transfer systems based on the use of a one-way link. For example, in a UDP multicast configuration involving a multiplexer and a demultiplexer with a plurality of UDP sources and destinations, a special syslog daemon described above may be implemented in one or more of the ports associated with the multiplexer. Under the present invention, the combination of syslog and one-way data transfer applications based on the use of a one-way data link may further enhance the network security.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A send node for sending a syslog message to a receive node through a one-way data link, comprising:
   a UDP socket for receiving a first syslog message from a syslog sender, the first syslog message comprising a header portion including IP information for identifying the syslog sender and a data portion;
   a syslog daemon for extracting the IP information of the syslog sender from the header portion of the received first syslog message, and inserting the extracted IP information of the syslog sender in the data portion of the received first syslog message, thereby generating a second syslog message, wherein the UDP socket is further configured to remove the header portion from the second syslog message generated by the syslog daemon, thereby generating a third syslog message; and
   an interface to the one-way data link for sending the third syslog message to the receive node through the one-way data link.

2. The send node of claim 1, wherein the first syslog message from the syslog sender is a raw UDP datagram and the IP information comprises an IP address or a host name of the syslog sender.

3. A one-way data transfer system, comprising:
   a syslog sender for generating a first syslog message, the first syslog message comprising a header portion including IP information for identifying the syslog sender and a data portion;
   a send node comprising (1) a UDP socket for receiving the first syslog message from the syslog sender, and (2) a syslog daemon for extracting the IP information of the syslog sender from the header portion of the first syslog message and inserting the extracted IP information of the syslog sender in the data portion of the first syslog message, thereby generating a second syslog message, wherein the UDP socket is further configured to remove the header portion from the second syslog message generated by the syslog daemon, thereby generating a third syslog message; and
   a one-way data link for unidirectional transfer of the third syslog message from the send node to a receive node.

4. The one-way data transfer system of claim 3, wherein the first syslog message from the syslog sender is a raw UDP datagram and the IP information comprises an IP address or a host name of the syslog sender.

5. A machine readable medium having instructions stored on a send node for sending a syslog message to a receive node through a one-way data link, the instructions, when executed by the send node, causing the send node to:
   receive a first syslog message from a syslog sender, the first syslog message comprising a header portion including IP information for identifying the syslog sender and a data portion;
   extract the IP information of the syslog sender from the header portion of the received first syslog message;
   insert the extracted IP information of the syslog sender in the data portion of the received first syslog message, thereby generating a second syslog message;
   remove the header portion from the second syslog message, thereby generating a third syslog message; and
   send the third syslog message to the receive node through the one-way data link.

6. The machine readable medium of claim 5, wherein the first syslog message from the syslog sender is a raw UDP datagram and the IP information comprises an IP address or a host name of the syslog sender.

7. A method of transmitting a syslog message from a syslog sender to a syslog receiver through a one-way data link, comprising the steps of:

receiving a first syslog message from the syslog sender, the first syslog message comprising a header portion including IP information for identifying the syslog sender and a data portion;

extracting the IP information of the syslog sender from the header portion of the received first syslog message;

inserting the extracted IP information of the syslog sender in the data portion of the received first syslog message, thereby generating a second syslog message;

removing the header portion from the second syslog message, thereby generating a third syslog message; and sending the third syslog message to the syslog receiver through the one-way data link.

8. The method of claim 7, wherein the first syslog message from the syslog sender is a raw UDP datagram and the IP information comprises an IP address or a host name of the syslog sender.

9. The one-way data transfer system of claim 3, further comprising a syslog receiver for receiving the third syslog message from the receive node.

10. The method of claim 7, further comprising the step of examining the IP information embedded in the third syslog message received by the syslog receiver to identify the syslog sender.

* * * * *